United States Patent
Spellward et al.

(10) Patent No.: US 9,256,644 B1
(45) Date of Patent: Feb. 9, 2016

(54) SYSTEM FOR IDENTIFYING AND INVESTIGATING SHARED AND DERIVED CONTENT

(71) Applicants: Peter C. Spellward, Bristol (GB); Howard C. Snart Woodhouse, Bristol (GB)

(72) Inventors: Peter C. Spellward, Bristol (GB); Howard C. Snart Woodhouse, Bristol (GB)

(73) Assignee: CA, Inc., New York, NY (US)

( * ) Notice: Subject to any disclaimer, the term of this patent is extended or adjusted under 35 U.S.C. 154(b) by 176 days.

(21) Appl. No.: 13/839,943

(22) Filed: Mar. 15, 2013

(51) Int. Cl.
G06F 17/30 (2006.01)

(52) U.S. Cl.
CPC .... *G06F 17/30477* (2013.01); *G06F 17/30109* (2013.01)

(58) Field of Classification Search
USPC .......................................... 707/723, 736, 747
See application file for complete search history.

(56) References Cited

U.S. PATENT DOCUMENTS

| | | | | |
|---|---|---|---|---|
| 6,553,372 | B1* | 4/2003 | Brassell et al. ........................ 1/1 |
| 6,658,626 | B1* | 12/2003 | Aiken ............................ 715/205 |
| 7,243,102 | B1* | 7/2007 | Naam et al. ............................ 1/1 |
| 7,702,683 | B1* | 4/2010 | Kirshenbaum ... G06F 17/30109 707/718 |
| 7,840,557 | B1* | 11/2010 | Smith et al. .................... 707/722 |
| 7,953,706 | B2* | 5/2011 | Prahlad et al. ...... G06F 11/1453 707/665 |
| 8,108,412 | B2* | 1/2012 | Patterson ....................... 707/754 |
| 8,266,113 | B2* | 9/2012 | Radatti .................... G06F 21/56 707/690 |
| 8,538,989 | B1* | 9/2013 | Datar et al. ................... 707/780 |
| 8,607,335 | B1* | 12/2013 | Liu et al. ........................ 713/188 |
| 8,880,502 | B2* | 11/2014 | Waldvogel et al. ........... 707/713 |
| 8,886,648 | B1* | 11/2014 | Procopio et al. .............. 707/737 |
| 2003/0120647 | A1* | 6/2003 | Aiken et al. ....................... 707/3 |
| 2005/0108001 | A1* | 5/2005 | Aarskog ......................... 704/10 |
| 2005/0149510 | A1* | 7/2005 | Shafrir .............................. 707/3 |
| 2006/0106792 | A1* | 5/2006 | Patterson .......................... 707/5 |
| 2008/0059404 | A1* | 3/2008 | Jonker et al. ..................... 707/2 |
| 2008/0082554 | A1* | 4/2008 | Pedersen ....................... 707/100 |
| 2009/0083677 | A1* | 3/2009 | Darwish et al. ............... 715/854 |
| 2010/0287172 | A1* | 11/2010 | Schneider .................... 707/759 |
| 2011/0066841 | A1* | 3/2011 | Goodrow et al. ... H04L 43/0894 713/150 |
| 2011/0113042 | A1* | 5/2011 | Green et al. .................. 707/749 |
| 2012/0109966 | A1* | 5/2012 | Liang et al. .................. 707/740 |
| 2012/0117080 | A1* | 5/2012 | Lamanna et al. ............. 707/747 |

* cited by examiner

*Primary Examiner* — Cam-Linh Nguyen
(74) *Attorney, Agent, or Firm* — Baker Botts L.L.P.

(57) ABSTRACT

A computer readable storage medium with computer readable program code. The computer readable program code may be configured to index a plurality of documents into a document library stored in a database. The computer readable program code may be configured to receive a query document and to compare the query document with each indexed document to generate a score for each indexed document. The score represents a measure of similarity between the query document and each indexed document. The computer readable program code may be configured to display a query result based on the score for each indexed document.

20 Claims, 5 Drawing Sheets

SYSTEM FOR IDENTIFYING AND INVESTIGATING SHARED AND DERIVED CONTENT

BACKGROUND

The present disclosure relates to shared content, more specifically, to identifying and analyzing documents that may include some similar content.

People create documents. Some documents created may be derived from other documents. Some of these documents may share similar content or portions of identical content. There may be many versions of documents sharing content. Documents may be stored in databases, network servers, or personal computers. Documents sharing content may be stored in multiple databases, servers, or computers. In some cases, documents may proliferate beyond the database, server, or computer in which the documents were originally stored. In some cases, documents which proliferate may be controlled, proprietary, or otherwise contain confidential information.

BRIEF SUMMARY

According to one aspect of the present disclosure, a computer program product includes a computer readable storage medium with computer readable program code. The computer readable program code may be configured to index a plurality of documents into a document library stored in a database. The computer readable program code may be configured to receive a query document and to compare the query document with each indexed document to generate a score for each indexed document. The score represents a measure of similarity between the query document and each indexed document. The computer readable program code may be configured to display a query result based on the score for each indexed document.

According to another aspect of the present disclosure, a computer program product includes a computer readable storage medium with computer readable program code. The computer readable program code may be configured to index a plurality of documents into a document library stored in a database. The computer readable program code may be configured to compare each indexed document to each other indexed document to generate a score for each pair of indexed documents. The score represents a measure of similarity between each pair of indexed documents. The computer readable program code may be configured to display a visual representation of the similarity of the indexed documents to one another based on the score for each pair of indexed documents.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
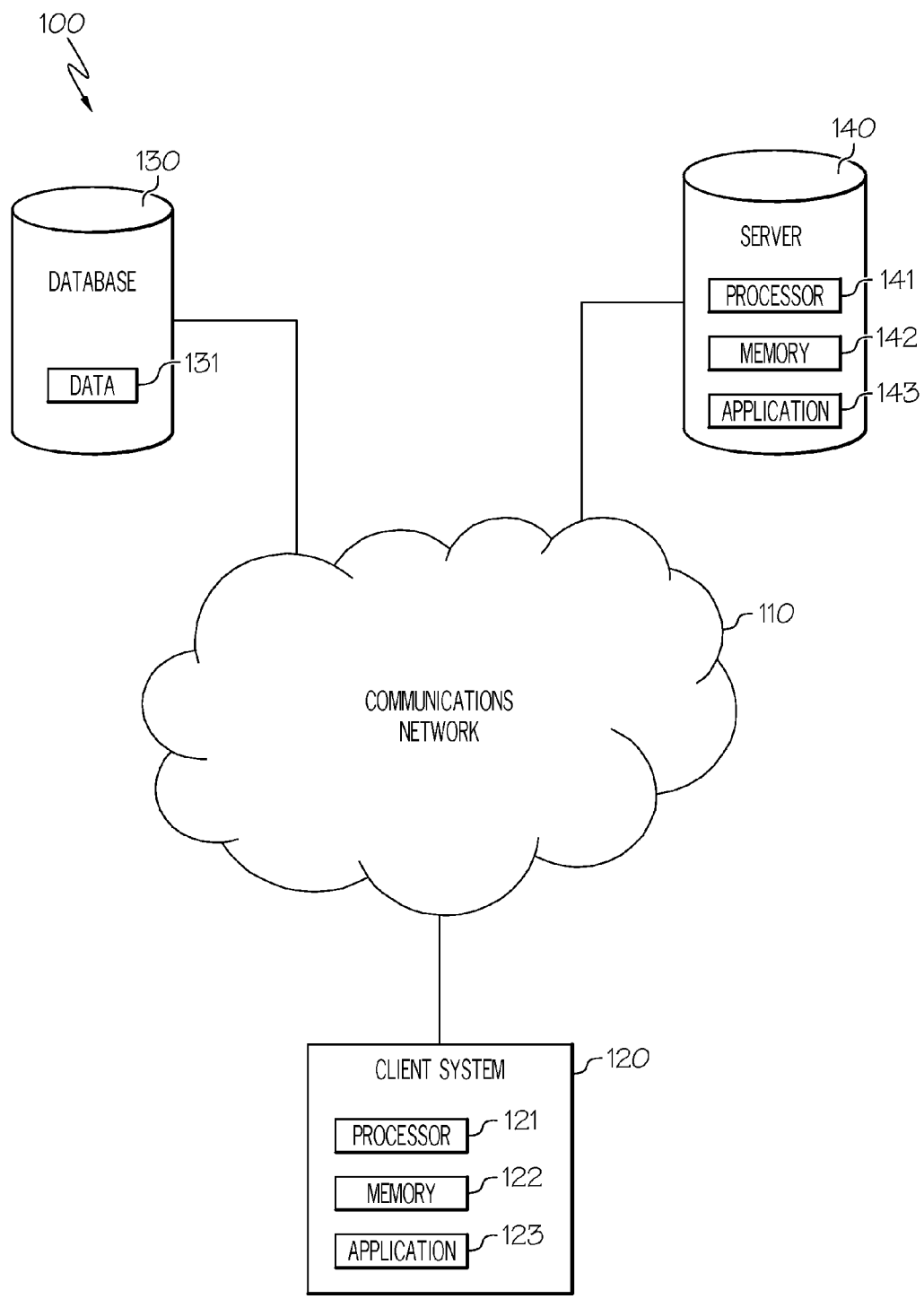
FIG. 1 shows an example system for identifying and analyzing documents that may include some similar content, according to certain embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates an example embodiment of a system 100 for identifying and analyzing documents that may include some similar content. In a particular embodiment, a document may include some similar content as a result of being derived from another document. In an alternative embodiment, a document may share at least some content as a result of being the same type of document or as a result of being created by the same author. The illustrated embodiment includes client system 120, database 130, server 140, and communications network 110.

Database 130 may include any suitable resources for storing documents, document libraries, data, and other information. For example, database 130 may include, without limitation, a database or database server (e.g., an SQL database or server), a web service provided by a web server, and/or one or more files stored using the file system of a storage device (e.g., a text file, CSV file, or spreadsheet). In particular embodiments, database 130 may store data 131. Data 131 may include documents, document libraries, hash values associated with documents, and information pertaining to documents such as metadata. In the illustrated embodiment, database 130 is communicatively coupled to server 140 and client system 120 over communications network 110. In other embodiments, database 130 may be implemented locally on client system 120 and/or server 140.

Client system 120 may communicate with database 130 and server 140. Client system 120 may comprise any suitable hardware, software or encoded logic for performing the functionality described herein as associated with client system 120. In the illustrated embodiment, client system 120 includes a processor 121, memory 122, and application 123. Processor 121 may be a microprocessor, controller, or any other suitable computing device, resource, or combination of hardware, software, and/or encoded logic operable to perform functionality associated with client system 120. Memory 122 may be any form of volatile or non-volatile memory including, without limitation, magnetic data, optical media, random access memory (RAM), read-only memory (ROM), removable media, or any other suitable local or remote memory component, for storing information associated with the functionality discussed herein.

Application 123 of client system 120 may execute on processor 121 and may submit queries to database 130 or server 140. Application 123 may also receive data from database 130 or server 140. Data received by application 123 may include documents, document libraries, or groups of documents. Application 123 may be any suitable combination of hardware, software and/or encoded logic capable of performing the functionality described herein when executed by processor 121.

In particular embodiments, application 123 may be an application for identifying and analyzing documents that may include some similar content. Application 123 may allow a user to select a query document from documents stored on database 130, server 140, or client system 120. In a particular embodiment, application 123 may compare the selected query document to a document library stored on database 130, server 140, or client system 120 to generate a measure of similarity between the query document and each document indexed in the document library. In a particular embodiment, a document library may comprise an indexed list of documents or document IDs, hash values calculated for each document, and metadata associated with each document. Indexing documents in a document library may comprise storing hashes associated with each document in such a way that the hashes for the documents may be efficiently looked up. In an alternative embodiment, application 123 may compare the selected query document to a group of documents stored on database 130, server 140, or client system 120 to generate a measure of similarity between the query document and each document in the group of documents. Additionally, application 123 may generate a list of documents bearing similarity to the query document. Application 123 may generate a score for each document bearing similarity to the query document and use such score to rank documents in order of similarity.

In an additional embodiment, application 123 may allow a user to select a document library or multiple document libraries stored on database 130, server 140, or client system 120 and generate a measure of similarity between each pair of documents indexed in the document library or libraries. In an additional embodiment, application 123 may allow a user to select a group of documents, or multiple groups of documents stored on database 130, server 140, or client system 120. Application 123 may be operable to compare each document in the selected group or groups with each other document in the selected group or groups to generate a measure of similarity between each pair of documents. Additionally, application 123 may generate a visualization illustrating a degree of similarity between pairs of documents.

In particular embodiments, application 123 may perform a comparison between documents using hash values for each document to be compared. Hash values may be calculated for a window of text in each document. In a particular embodiment, the window of text may correspond generally to the words, sentences, paragraphs, or pages of the document. In a particular embodiment, application 123 may use pre-calculated hash values stored in the document libraries described above to perform a comparison. In an alternative embodiment, application 123 may be operable to generate hash values for the query document and compare these hash values to hash values stored in the document libraries. In an alternative embodiment, application 123 may be operable to generate hash values for the query document and compare these hash values to hash values generated for documents stored on database 130, server 140, or client system 120.

Server 140 may include any suitable resources for storing documents, document libraries, data, and other information. For example, server 140 may include, without limitation, a database or database server (e.g., an SQL database or server), a web service provided by a web server, and/or one or more files stored using the file system of a storage device (e.g., a text file, CSV file, or spreadsheet). In the illustrated embodiment, server 140 includes a processor 141, memory 142, and application 143. Processor 141 may be a microprocessor, controller, or any other suitable computing device, resource, or combination of hardware, software, and/or encoded logic operable to perform functionality associated with server 140. Memory 142 may be any form of volatile or non-volatile memory including, without limitation, magnetic data, optical media, random access memory (RAM), read-only memory (ROM), removable media, or any other suitable local or remote memory component, for storing information associated with the functionality discussed herein. In the illustrated embodiment, server 140 is communicatively coupled to the database 130 and client system 120 over communications network 110. In other embodiments, server 140 may be implemented locally on client system 120 or database 130.

Application 143 of server 140 may execute on processor 141 and may submit queries to database 130 or client system 120. Application 143 may also receive data from database 130 or client system 120. Data received by application 143 may include documents, document libraries, or groups of documents. Application 143 may be any suitable combination of hardware, software and/or encoded logic capable of performing the functionality described herein when executed by processor 141.

In particular embodiments, application 143 may be an application for identifying and analyzing documents that may include some similar content. Application 143 may allow a user to select a query document from documents stored on database 130, server 140, or client system 120. In a particular embodiment, application 143 may compare the selected query document to a document library stored on database 130, server 140, or client system 120 to generate a measure of similarity between the query document and each document indexed in the document library. In a particular embodiment, a document library may comprise an indexed list of documents or document IDs, hash values calculated for each document, and metadata associated with each document. Indexing documents in a document library may comprise storing hashes associated with each document in such a way that the hashes for the documents may be efficiently looked up. In an alternative embodiment, application 143 may compare the selected query document to a group of documents stored on database 130, server 140, or client system 120 to generate a measure of similarity between the query document and each document in the group of documents. Additionally, application 143 may generate a list of documents bearing similarity to the query document. Application 143 may generate a score for each document bearing similarity to the query document and use such score to rank documents in order of similarity.

In an additional embodiment, application 143 may allow a user to select a document library or multiple document libraries stored on database 130, server 140, or client system 120 and generate a measure of similarity between each pair of documents indexed in the document library or libraries. In an additional embodiment, application 143 may allow a user to select a group of documents, or multiple groups of documents stored on database 130, server 140, or client system 120. Application 143 may be operable to compare each document in the selected group or groups with each other document in the selected group or groups to generate a measure of similarity between each pair of documents. Additionally, application 143 may generate a visualization illustrating a degree of similarity between pairs of documents.

In particular embodiments, application 143 may perform a comparison between documents using hash values for each document to be compared. Hash values may be calculated for a window of text in each document. In a particular embodiment, the window of text may correspond generally to the words, sentences, paragraphs, or pages of the document. In a particular embodiment, application 143 may use pre-calculated hash values stored in the document libraries described above to perform a comparison. In an alternative embodiment, application 143 may be operable to generate hash values for the query document and compare these hash values to hash values stored in the document libraries. In an alternative embodiment, application 143 may be operable to generate hash values for the query document and compare these hash values to hash values generated for documents stored on database 130, server 140, or client system 120.

Communications network 110 may facilitate communications among client system 120, database 130, and server 140. Communications network 110 may be any interconnection of components capable of transmitting communication signals, data, and/or messages, such as a local area network (LAN), wide area network (WAN), global distributed network (e.g., the Internet), Intranet, Extranet, or any other form of wireless or wireline communication network.

Figure 2:
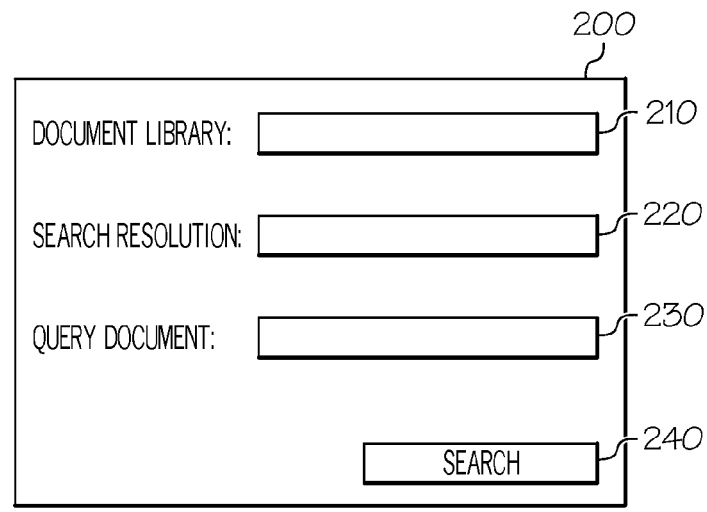
FIG. 2 illustrates an example interface to receive a user request to search for documents similar to a query document, according to certain embodiments of the present disclosure.

FIG. 2 illustrates an example interface 200 to receive a user request to search for documents similar to a query document. The illustrated embodiment includes document library field 210, search resolution field 220, query document field 230, and search button 240. In one embodiment, interface 200 may be used by application 123 or application 143 of FIG. 1 to receive a user request.

In the illustrated embodiment, document library field 210 may receive user input selecting a document library or document libraries. In a particular embodiment, a document library may comprise an indexed list of documents or document IDs, hash values calculated for each document, and metadata associated with each document. In an alternative embodiment, document library field 210 may receive user input selecting a group or multiple groups of stored documents. In the illustrated embodiment, document libraries may be stored on database 130, server 140, or client system 120 of FIG. 1. In an alternative embodiment, documents may be stored on database 130, server 140, or client system 120 of FIG. 1. Query document field 230 may receive a user selection of a query document. A query document may be located on database 130, server 140, or client system 120 of FIG. 1. In particular embodiment, query document field 230 may receive user input of text that is typed by the user or copied and pasted from another document by the user.

Search resolution field 220 may receive a user selection of the length of a window of text over which hash values may be calculated and compared. Such a window of text may correspond generally to words, sentences, paragraphs, or pages. For example, a user may specify "sentences" in search resolution field 220. In this case, application 123 or 143 may calculate hash values over windows of text corresponding to lengths of sentences in each indexed document and in the query document. In a particular embodiment, application 123 or 143 may calculate hash values corresponding generally to words, sentences, paragraphs, or pages and store those hash values for each document in a document library before receiving any user input from interface 200. In such an embodiment, application 123 or 143 uses the user selection in search resolution field 220 to determine what length of hash values to use to perform the comparison. For example, application 123 or 143 may have stored hash values corresponding to a length of "sentences" in a document hash library, but application 123 or 143 may receive user input selecting a length of "paragraphs." In this case, application 123 or 143 may aggregate the stored hash values to perform the comparison as a length of "paragraphs." In a particular embodiment, application 123 or 143 will not perform a comparison using smaller hash values than were previously calculated. For example, if hash values of lengths of paragraphs were previously calculated and stored in a document library, application 123 or 143 may not perform a comparison using hash values of lengths of sentences. In an alternative embodiment, application 123 or 143 receives the user selection of the length of the window of text and retrieves the hash values corresponding to the selected length to perform the comparison.

Application 123 or 143 may receive input through search button 240 to cause application 123 or 143 to execute a search using the selections made in document library field 210, search resolution field 220, and query document field 230. In one embodiment, selecting search button 240 may cause application 123 or 143 to calculate hash values for length of a window of text corresponding to the selection made in search resolution field 220 for the query document selected in query document field 230. Application 123 or 143 compare the hash values calculated for the query document selected in query document field 230 to hash values calculated for the documents selected in document library field 210 to calculate a measure of similarity between the query document and each stored document. In a particular embodiment, application 123 or 143 may query the document library selected in document library field 210 for each calculated hash value and, for each calculated hash value, receive document IDs for those documents with matching hash values. By using the document IDs, application 123 or 143 may calculate a measure of similarity between the query document and each indexed document. Application 123 or 143 use the measure of similarity for each indexed document to create a result list of stored documents ordered at least in part on the measure of similarity between the query document and the stored document. For example, application 123 or 143 may create query result list 300 of FIG. 3 using the measure of similarity for each indexed document. In a particular embodiment, application 123 or 143 generate a score to represent the measure of similarity between an indexed document and the query document. In an alternative embodiment, application 123 or 143 may retrieve hash values from document libraries selected in document library field 210 and stored in database 130, server 140, or client system 120. In such an embodiment, application 123 or 143 use the user input received in document library field 210 and search resolution field 220 to retrieve the hash values stored in database 130, server 140, or client system 120, and compare them at the appropriate resolution to the hash values application 123 or 143 calculate for query document selected in query document field 230.

Figure 3:
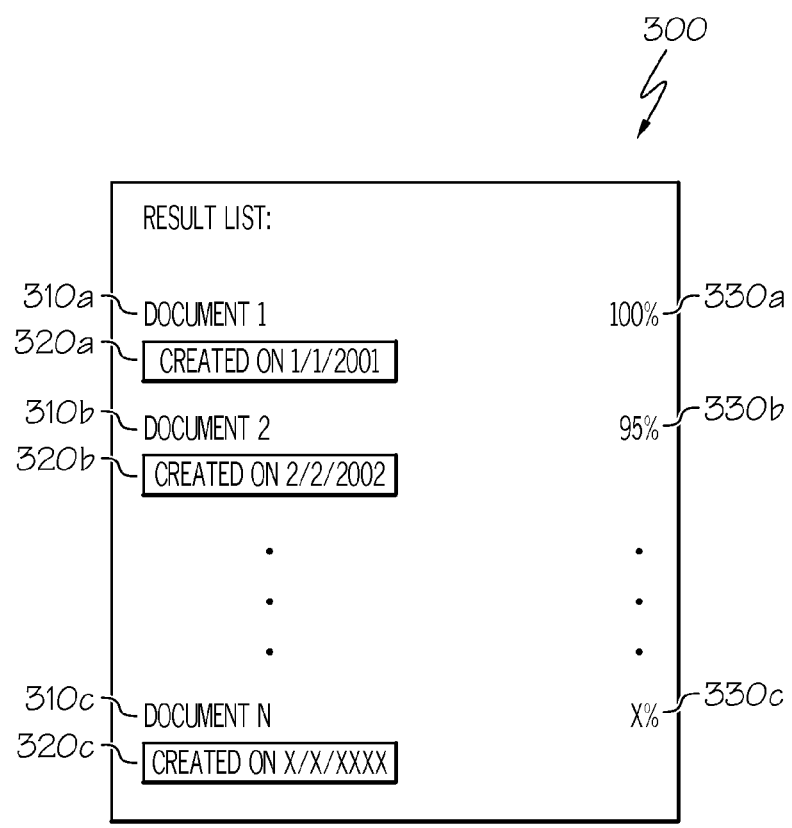
FIG. 3 illustrates an example query result list, according to certain embodiments of the present disclosure.

FIG. 3 illustrates an example query result list 300. Example query result list 300 contains indexed document titles 310a, 310b, and 310c; metadata 320a, 320b, and 320c for each indexed document displayed in query result list 300, and a measure of similarity 330a, 330b, and 330c for each indexed document displayed in query result list 300. Application 123 or 143 of FIG. 1 may generate query result list 300 from user selections made in document library field 210, search resolution field 220, and query document field 230 and receiving a user selection of search button 240 in interface 200 of FIG. 2. Result list 300 displays a list of indexed documents bearing some degree of similarity to a query document.

Document titles 310a, 310b, and 310c may be titles of indexed documents having some degree of similarity to a query document. Alternatively, document titles 310a, 310b, and 310c may be used to display a file name or directory path of an indexed document bearing some degree of similarity to a query document. In another embodiment, document titles 310a, 310b, and 310c may be links to documents. In one embodiment, document title 310a may appear at the top of result list 300 if the indexed document having document title 310a has the greatest degree of similarity to a query document of all documents in result list 300. In another embodiment stored, document title 310a may appear at the top of result list 300 if the indexed document having document title 310a has the least degree of similarity to a query document of all documents in result list 300. In yet another embodiment, document title 310a may appear at the top of result list 300 if document title 310a would come before document titles 310b and 310c alphabetically. In yet another embodiment, the order of document titles 310a, 310b, and 310c may be influenced by a piece of metadata associated with each document title 310a, 310b, and 310c.

Metadata 320a, 320b, and 320c may display information contained in metadata for each indexed document corresponding to the associated document title 310a, 310b, and 310c. For example, metadata 320a may display information contained in metadata associated with the document having document title 310a. Metadata 320a may display information such as the date the document was created, the name of the author of the document, the system the document was created on, the path or file location of the document, or the like.

Measure of similarity 330a, 330b, and 330c shows a measure of similarity between each indexed document listed in result list 300 and a query document. For example, measure of similarity 330a shows a measure of similarity between the indexed document having document title 310a and a query document. In one embodiment, measure of similarity 330a, 330b, and 330c may display a percentage as a measure of similarity between an indexed document and a query document. In such an embodiment, a higher percentage represents a higher degree of similarity between a indexed document and a query document than a lower percentage. In a particular embodiment, the percentage may indicate the percentage of hashes that match between a indexed document and a query document for a selected length of a window of text. In another embodiment, measure of similarity 330a, 330b, and 330c may display a score with a higher score representing a greater degree of similarity between a stored document and a query document.

In certain embodiments, application 123 or 143 may receive user input selecting a document title. Application 124 or 143 may display a version of the query document containing text that matches the selected indexed document visually differentiated from non-matching text. In a particular embodiment, application 123 or 143 may display the query document as an HTML render of the text contained in the query document.

Figure 4:
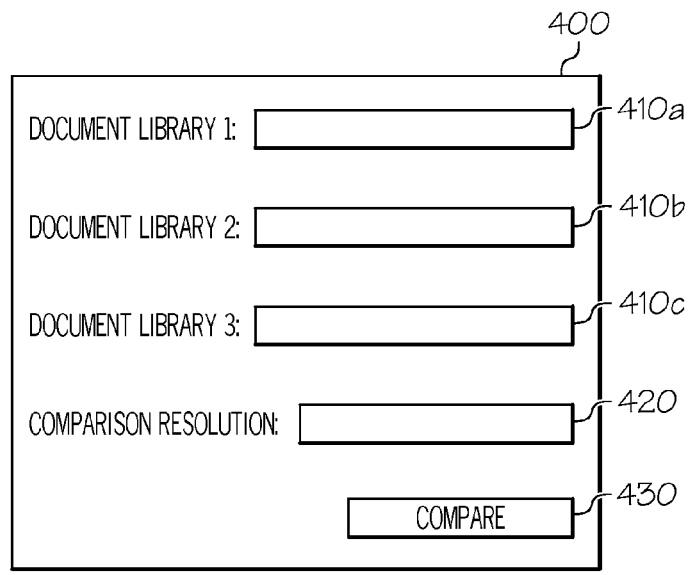
FIG. 4 illustrates an example interface to receive user input to analyze the similarity among documents, according to certain embodiments of the present disclosure.

FIG. 4 illustrates an example interface 400 to receive user input to analyze the similarity among documents. The illustrated embodiment includes document library fields 410a, 410b, and 410c, comparison resolution field 420, and comparison button 430. In one embodiment, application 123 or 143 of FIG. 1 may use interface 400 to receive input information from a user.

In the illustrated embodiment, document library fields 410a, 410b, and 410c may receive a user selection of a document library or multiple document libraries. In a particular embodiment, a document library may comprise an indexed list of documents or document IDs, hash values calculated for each document, and metadata associated with each document. Document libraries may be stored on database 130, server 140, or client system 120 of FIG. 1. In an alternative embodiment, document library fields 410a, 410b, and 410c may receive a user selection of a group of documents or multiple groups of documents. Documents may be stored on database 130, server 140, or client system 120 of FIG. 1.

Comparison resolution field 420 may receive a user selection of the length of a window of text over which hash values may be compared. Such a window of text may correspond generally to words, sentences, paragraphs, or pages. For example, a user may specify "sentences" in comparison resolution field 420. In this case, application 123 or 143 may calculate hash values over windows of text corresponding to lengths of sentences in each indexed document. In a particular embodiment, application 123 or 143 may calculate hash values corresponding generally to words, sentences, paragraphs, or pages and store those hash values for each document in a document library before receiving any user input from interface 400. In such an embodiment, application 123 or 143 uses the user selection in comparison resolution field 420 to determine what length of hash values to use to perform the comparison. For example, application 123 or 143 may have stored hash values corresponding to a length of "sentences" in a document hash library, but application 123 or 143 may receive user input selecting a length of "paragraphs." In this case, application 123 or 143 may aggregate the stored hash values to perform the comparison as a length of "paragraphs." In a particular embodiment, application 123 or 143 will not perform a comparison using smaller hash values than were previously calculated. For example, if hash values of lengths of paragraphs were previously calculated and stored in a document library, application 123 or 143 may not perform a comparison using hash values of lengths of sentences. In an alternative embodiment, application 123 or 143 receives the user selection of the length of the window of text and retrieves the hash values corresponding to the selected length to perform the comparison.

Application 123 or 143 may receive input through comparison button 430 to cause application 123 or 143 to execute a comparison using the selections made in document library fields 410a, 410b, and 410c, and comparison resolution field 420. In one embodiment, user selection of comparison button 430 may cause application 123 or 143 to calculate hash values for lengths of a window of text corresponding to the selection made in comparison resolution field 420 for each indexed document selected in document library fields 410a, 410b, and 410c. Application 123 or 143 may compare hash values for each pair of stored documents selected in document library fields 410a, 410b, and 410c to calculate a measure of similarity between each pair of documents. Application 123 or 143 use the measure of similarity for each pair of stored documents to create a visualization based at least in part on the measure of similarity between the each pair of stored documents. For example, application 123 or 143 may create visual representation 500 of FIG. 5 using the measure of similarity for each pair of documents. In a particular embodiment, application 123 or 143 generates a score to represent the measure of similarity between each pair of stored documents. In an alternative embodiment, application 123 or 143 may retrieve hash values from document libraries selected in document library fields 410a, 410b, and 410c and stored in database 130, server 140, or client system 120. In such an embodiment, application 123 or 143 uses the user input received in document library fields 410a, 410b, and 410c and search resolution field 420 to retrieve the hash values stored in database 130, server 140, or client system 120, and compare them at the appropriate resolution to the hash values stored for other documents indexed in the document libraries selected in document library fields 410a, 410b, and 410c.

Figure 5:
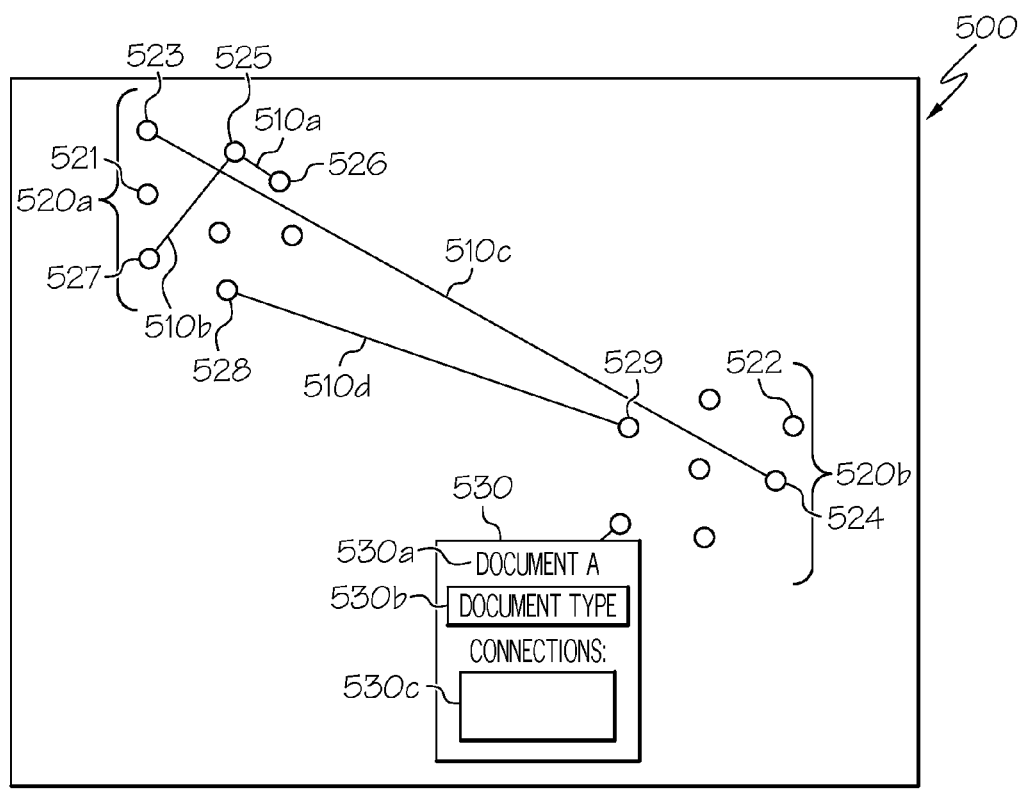
FIG. 5 illustrates an example visual representation of document similarity, according to certain embodiments of the present disclosure.

FIG. 5 illustrates an example visual representation 500 of document similarity. The illustrated embodiment includes nodes 521, 522, 523, 524, 525, 526, 527, 528, and 529; connections 510a, 510b, 510c, and 510d; and document information display 530. Application 123 or application 143 of FIG. 1 may generate and display visual representation 500. Visual representation 500 may result from receiving user selections in document library fields 410a, 410b, and 410c, search resolution field 420, and receiving user selection of comparison button 430 in interface 400 of FIG. 4. Visual representation 500 displays a graphical representation of degrees of similarity between at least some documents in a selected set.

In the illustrated embodiment, nodes 521, 522, 523, 524, 525, 526, 527, 528, and 529 each represent a document. Visual representation 500 may place nodes in groups in order to visualize a similarity in the content of the documents represented by the nodes. In a particular embodiment, visual representation 500 may place nodes in groups in order to visualize some other commonality between the documents besides a similarity in content. A commonality between documents which causes visual representation 500 to place nodes in a group could include a common system of origin between the documents, a common author between the documents, a common document type between the documents, or the like. For example, the documents represented by the nodes grouped into group 520a may have come from the same system of origin, while the documents represented by the nodes grouped into group 520b may have come from a different system from those documents represented by the nodes grouped into group 520a.

Each node in a group of nodes may have a different color, shape, symbol or the like. Nodes having the same color, shape, symbol or the like may indicate that the documents represented by the nodes have a shared attribute such as document type, author, system of origin, date of creation, or the like. For example, in the illustrated embodiment all nodes have the same shape, which may indicate that all documents represented by the nodes have the same document type.

In the illustrated embodiment, some nodes are connected by connections 510a, 510b, 510c, and 510d. Each connection 510a, 510b, 510c, and 510d may indicate a degree of similarity between the documents represented by the nodes 523, 524, 525, 526, 527, 528, and 529. For example, connections 510a, 510b, 510c, and 510d may have a characteristic that may serve to illustrate the measure of similarity between the documents represented by the nodes 523, 524, 525, 526, 527, 528, and 529. The characteristic of the connections 510a, 510b, 510c, and 510d illustrating the measure of similarity between two documents may be the length, thickness, color, style, or the like of the line. In a particular embodiment, the length of connection 510a between nodes 525 and 526 may indicate the degree of similarity between the pair of documents represented by nodes 525 and 526. For example, if connection 510a between nodes 525 and 526 is shorter than connection 510b between nodes 525 and 527, this may indicate that the degree of similarity between the documents represented by nodes 525 and 526 is greater than the degree of similarity between the documents represented by nodes 525 and 527. In an alternative embodiment, the thickness of connection 510a between nodes 525 and 526 may indicate the degree of similarity between the pair of documents represented by nodes 525 and 526. For example, if connection 510a between nodes 525 and 526 is thicker than connection 510b between nodes 525 and 527, this may indicate that the degree of similarity between the documents represented by nodes 525 and 526 is greater than the degree of similarity between the documents represented by nodes 525 and 527. In yet another embodiment, the color of connection 510a between nodes 525 and 526 may indicate the degree of similarity between the pair of documents represented by nodes 525 and 526. For example, if the color of connection 510a between nodes 525 and 526 is darker than the color of connection 510b between nodes 525 and 527, this may indicate that the degree of similarity between the documents represented by nodes 525 and 526 is greater than the degree of similarity between the documents represented by nodes 525 and 527. In yet another embodiment, the style of connection 510a between nodes 525 and 526 may indicate the degree of similarity between the pair of documents represented by nodes 525 and 526. For example, if dashes of connection 510a between nodes 525 and 526 are spaced more closely than dashes of connection 510b between nodes 525 and 527, this may indicate that the degree of similarity between the documents represented by nodes 525 and 526 is greater than the degree of similarity between the documents represented by nodes 525 and 527.

In the illustrated embodiment, connection 510a appears to be shorter than connection 510b. The length of connection 510a with respect to connection 510b may illustrate a greater measure of similarity between the documents represented by nodes 525 and 526 that connection 510a connects, than there is between the documents represented by nodes 525 and 527 that connection 510b connects. Likewise, in the illustrated embodiment, connection 510d appears to be shorter than connection 510c. The length of connection 510d with respect to connection 510c may illustrate a greater measure of similarity between the documents represented by nodes 528 and 529 that connection 510d connects, than there is between the documents represented by nodes 523 and 524 that connection 510c connects.

In a particular embodiment, nodes may be grouped into groups, as discussed above. For example, group 520a and group 520b. In such an embodiment the lengths of connections between nodes in a group may give an indication of the measure of similarity between documents represented by the nodes in the group, but the lengths of connections between nodes in different groups may not indicate the measure of similarity between the documents represented by the nodes in different groups. For example, in the illustrated embodiment, a distinction may be drawn between connection 510b and connection 510d. Connection 510b connects nodes 525 and 527 within node group 520a while connection 510d connects node 528 within node group 520a and node 529 within node group 520b. Although connection 510b may appear shorter than connection 510d, this may not indicate that the documents represented by nodes 525 and 527 have a greater measure of similarity than the documents represented by nodes 528 and 529. Put another way, the absolute length of a connection between two nodes may not reflect the absolute measure of similarity between the two nodes.

In the illustrated embodiment, document information display 530 is visible. Document information display 530 may become visible if a user selects a node 531 or otherwise chooses to see more information about a particular node 531. Document information display 530 may display a variety of information about the document represented by a particular node 531. In the illustrated embodiment, document information display 510 shows a document title 530a, document information 530b, and a connections list 530c. Document title 530a may display the title of the document represented by the selected node 531. Alternatively, document title 530a may display the file name or directory path of the document represented by the selected node 531. Document information 530b may display some additional information about the document represented by the selected node 531. In the illustrated embodiment, document information 530b displays the type of a document represented by the selected node 531. In other embodiments, document information 530b may display information such as the name of the document's author, the date the document was created, the last date the document was modified, the document's system of origin, or other information such as information that may be contained in metadata associated with the document. Connections list 530c may display a list of documents having a degree of similarity to the document represented by the selected node 531. In the illustrated embodiment, connections list 530c is blank because the document represented by the selected node 531 does not have a degree of similarity with any other displayed documents. In another embodiment, the connections list may be populated with a list of documents having a degree of similarity with the document represented by the selected node 531, in this case connections would be visible in visual representation 500 between the selected node 531 and other nodes representing documents listed in connections list 530c. In yet another embodiment, document information display 530 may be operable to open a window containing a list similar to query result list 300 illustrated in FIG. 3 of documents having a similarity to the document represented by the selected node 531.

Figure 6:
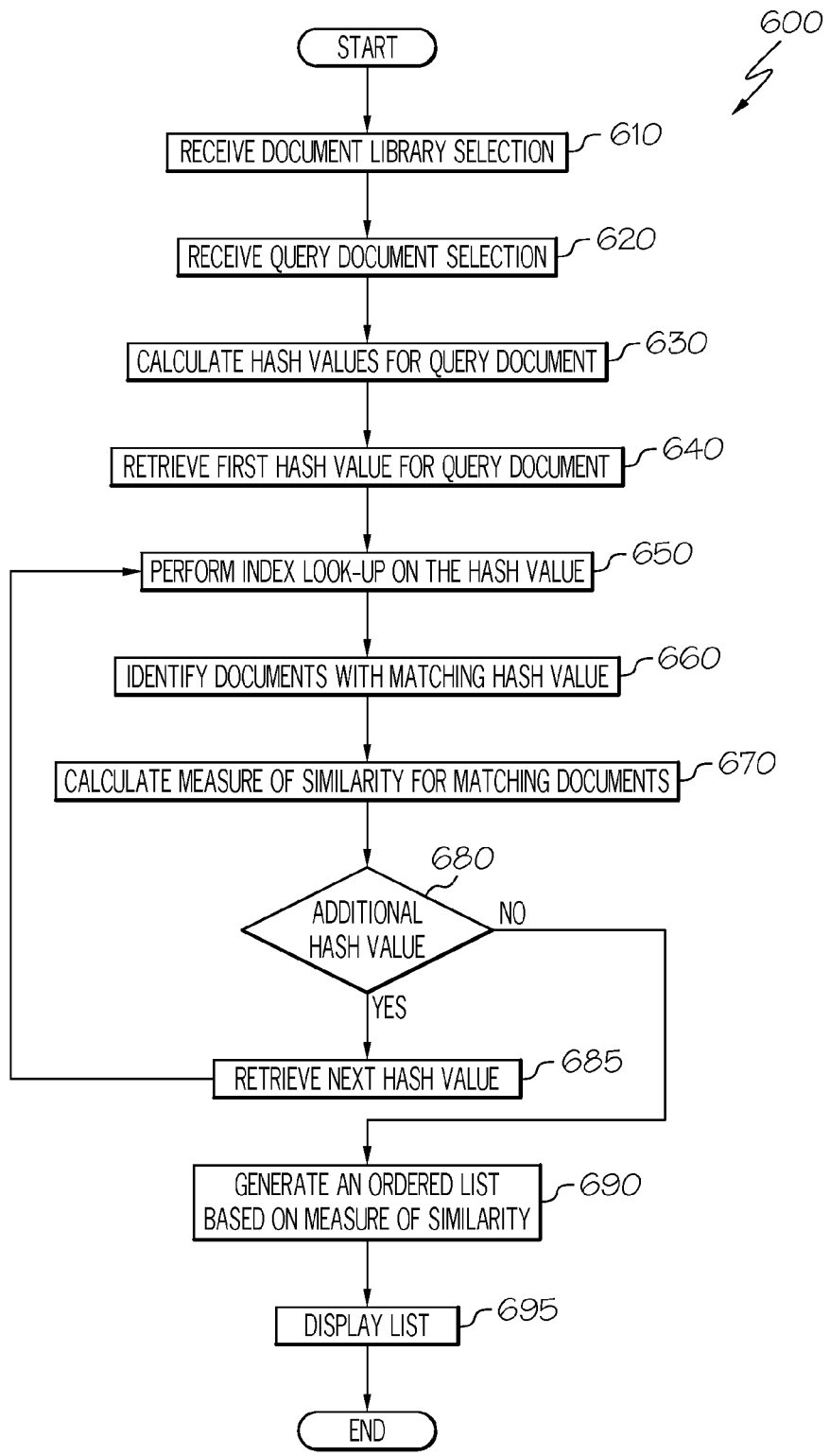
FIG. 6 illustrates an example flowchart of a method for searching a set of documents using a query document, according to certain embodiments of the present disclosure.

FIG. 6 illustrates a flowchart 600 of an example method for searching a group of documents using a query document. Method 600 may be implemented, for example, using the system of FIG. 1 or any other suitable system. In a particular embodiment, process blocks of Method 600 may be implemented by applications 123 or 143 of FIG. 1.

The method may begin at process block 610 where user input is received selecting document libraries to be searched using interface 200 of FIG. 2. Document libraries may be stored on client system 120, database 130, or server 140 of FIG. 1. In a particular embodiment, a document library may comprise an indexed list of documents, hash values calculated for each document, and metadata associated with each document. At process block 620, user input is received selecting a query document using interface 200. Client system 120, database 130 or server 140 may store the query document. In particular embodiment, application 123 or 143 may receive user input of text that is typed by the user or copied and pasted from another document by the user.

At process block 630, hash values are calculated for the query document. Hash values may be calculated over a window of text of a length a user selects, such as in search resolution field 220 of FIG. 2. For example, application 123 or 143 may calculate hash values for a window text corresponding generally to words, sentences, paragraphs, or pages. In a particular embodiment, application 123 or 143 may calculate hash values locally, such as at client system 120, or remotely, such as at server 140. In an alternative embodiment, application 123 or 143 may calculate hash values corresponding to each window of text length selectable in search resolution field 220 prior to the start of method 600 and store those hash values. In such an embodiment, at step 630, application 123 or 143 may retrieve the stored hash values for the window of text length selected in search resolution field 220.

At process block 640, a first hash value is retrieved for the query document. At process block 650, an index look-up is performed on the hash value in the selected document libraries. At process block 660, a list identifying documents indexed in the selected document libraries having a hash value matching the hash value of the query document is received. In a particular embodiment, the list may be a list of document IDs. At process block 670, a measure of similarity to the query document is calculated for each document identified as having a hash value matching a hash value for the query document. In a particular embodiment, application 123 or 143 may update a measure of the number of matching hash values for each document with at least one matching hash value. In a particular embodiment, application 123 or 143 may update a measure of similarity based on the number of matching hash values for those documents with at least one matching hash. In an alternative embodiment, application 123 or 143 performs this calculation after performing an index look-up on all hash values calculated for the query document. For example, given a set of two documents indexed in a document library that have at least one hash value matching the hash values of the query document, a document with five matching hash values will have a higher measure of similarity than a document with two matching hash values.

If at process block 680, additional hash values for the query document are determined to exist, the next hash value is retrieved at process block 685. Process block 650 will then be returned to, and an index look-up on the hash value will be performed.

If at process block 680, no remaining hash values for the query document are determined to exist, an ordered list of indexed documents having some similarity with the query document may be generated at least in part based on the measure of similarity between the documents indexed in the selected document libraries and the query document at process block 690. For example, application 123 or 143 may order the list from documents having the greatest similarity with the query document to documents having the least similarity. At process block 695, the list may be displayed. In one embodiment, application 123 or 143 may display query result list 300 of FIG. 3.

Figure 7:
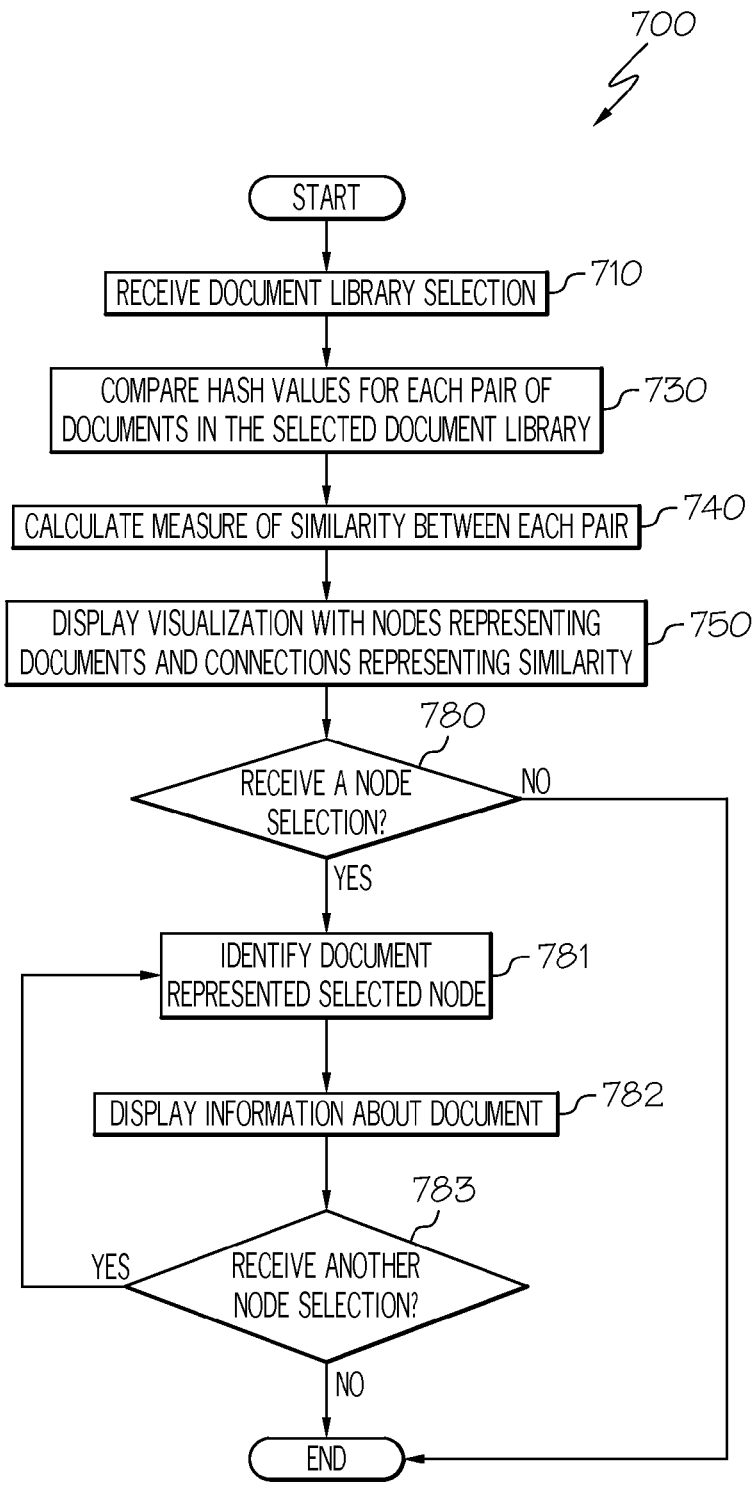
FIG. 7 illustrates an example flowchart of a method for comparing documents and visually displaying a representation of the comparison, according to certain embodiments of the present disclosure.

FIG. 7 illustrates a flowchart 700 of an example method for comparing documents in a group of documents. Method 700 may be implemented, for example, using the system of FIG. 1 or any other suitable system. In a particular embodiment, process blocks of Method 700 may be implemented by applications 123 or 143 of FIG. 1.

The method may begin at process block 710 where user input is received selecting document libraries to be compared. In a particular embodiment, application 123 or 143 may receive the user input through interface 200 of FIG. 2. Document libraries may be stored on client system 120, database 130, or server 140 of FIG. 1. In a particular embodiment, the selection of document libraries may include sets of documents indexed in different document libraries, for example, a set of documents indexed in a document library stored at a first location, such as database 130, and a set of documents indexed in a document library stored at a second location, such as server 140.

At process block 730, hash values for each pair of documents indexed in the selected document libraries may be compared. In a particular embodiment, application 123 or 143 may compare hash values corresponding to a window of text length selected in comparison resolution field 420.

At process block 740, a measure of similarity may be calculated for each pair of documents indexed in the selected document libraries having at least one matching hash value. In a particular embodiment, application 123 or 143 may store the measures of similarity for each pair of documents in a table. At process block 750, a visualization of the comparison of the stored documents may be generated and displayed. In one embodiment, the visualization displayed at step 750 may resemble visual representation 500 of FIG. 5. In a particular embodiment, application 123 or 143 may generate and display nodes representing documents in the visualization displayed at process block 750. The nodes application 123 or 143 generates may be nodes representing documents indexed in the selected document libraries that have similarity to other documents indexed in the selected document libraries and nodes representing documents indexed in the selected document libraries not having any similarity with other documents indexed in the selected document libraries. In a particular embodiment, application 123 or 143 may generate and display connections between nodes representing similarity between documents in the visualization displayed at process block 750.

At process block 780, a user selection of a node displayed at process block 750 may be received. At process block 781, the document represented by the node selected at process block 780 may be identified. At process block 782, information about the document represented by the node selected at process block 780 may be displayed. In a particular embodiment, application 123 or 143 may display document information display 530 of FIG. 5. At process block 783, another user selection of a node may be received, resulting in a return to process block 781.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of searching documents, comprising:
   indexing a plurality of documents into a document library stored in a database;
   receiving a query document;
   comparing, using a processor, the query document with each indexed document to generate a score for each indexed document, the score representing a measure of similarity between the query document and each indexed document;
   determining a commonality among particular ones of the indexed documents, other than the measure of similarity;
   displaying, at a user interface, a query result based on the score for each indexed document and based on the commonality;
   calculating hash values for each indexed document over each of a plurality of alternative windows;
   storing the hash values for each indexed document over each of the plurality of alternative windows;
   receiving user input selecting a particular one of the plurality of alternative windows;
   in response to receiving the selection of the particular one of the plurality of alternative windows, calculating hash values for the query document using the particular one of the plurality of alternative windows; and
   comparing the hash values for the query document with the hash values corresponding to the particular one of the plurality of alternative windows for each of the indexed documents to determine a measure of similarity between the query document and each indexed document.

2. The method of claim 1, wherein the plurality of alternative windows comprise words, sentences, paragraphs, and pages.

3. The method of claim 1, wherein a first indexed document has a higher score than a second indexed document if the query document is more similar to the first indexed document than the second indexed document.

4. The method of claim 1, wherein the query result comprises an ordered list of at least some of the indexed documents based on their scores.

5. The method of claim 1, wherein the query result comprises metadata for at least some of the indexed documents.

6. A computer program product comprising:
   a computer readable storage medium having computer readable program code embodied therewith, the computer readable program code comprising:
   computer readable program code configured to index a plurality of documents into a document library stored in a database;
   computer readable program code configured to receive a query document;
   computer readable program code configured to compare the query document with each indexed document to generate a score for each indexed document, the score representing a measure of similarity between the query document and each indexed document;
   computer readable program code configured to display a query result based on the score for each indexed document;
   computer readable program code configured to calculate hash values for each indexed document over each of a plurality of alternative windows;
   computer readable program code configured to store the hash values for each indexed document over each of the plurality of alternative windows;
   computer readable program code configured to receive user input selecting a particular one of the plurality of alternative windows;
   computer readable program code configured to, response to receiving the selection of that particular one of the plurality of alternative windows, calculate hash values for the query document using the particular one of the plurality of alternative windows; and
   computer readable program code configured to compare the hash values of the query document with the hash values corresponding to the particular one of the plurality of alternative windows for each of the indexed documents to determine a measure of similarity between the query document and each indexed document.

7. The computer program product of claim 6, wherein the plurality of alternative windows correspond to words, sentences, paragraphs, or pages.

8. The computer program product of claim 6, wherein a first indexed document has a higher score than a second stored document if the query document is more similar to the first indexed document than the second stored document.

9. The computer program product of claim 6, wherein the query result comprises an ordered list of at least some of the indexed documents based on their scores.

10. The computer program product of claim 6, wherein the query result comprises metadata for at least some of the indexed documents.

11. A method of comparing documents, comprising:
    indexing a plurality of documents into a document library stored in a database;
    calculating hash values for each indexed document over each of a plurality of alternative windows;
    receiving user input selecting a particular one of the plurality of alternative windows;
    in response to receiving the user input selecting the particular one of the plurality of alternative windows, comparing, using a processor, each indexed document to each other indexed document using the particular one of the plurality of alternative windows to generate a score for each pair of indexed documents, the score representing a measure of similarity between each pair of indexed documents; and displaying a visual representation of the similarity of the indexed documents to one another based on the score for each pair of stored documents.

12. The method of claim 11, wherein displaying a visual representation comprises:

displaying a node to represent each indexed document; and displaying a connection between a least one pair of nodes, wherein a characteristic of the connection represents a measure of similarity between a pair of indexed documents represented by the pair of nodes.

13. The method of claim 12, wherein:

the connection comprises a line; and the characteristic of the connection comprises one of thickness, color, length, or style of the line.

14. The method of claim 12, wherein:

the connection comprises a line;

the characteristic of the connection comprises a length of the line; and a first line between a first pair of nodes representing a first pair of documents is shorter than a second line between a second pair of nodes representing a second pair of documents if the first pair of documents are more similar to one another than the second pair of documents are similar to one another.

15. The method of claim 12, wherein:

the connection comprises a line;

the characteristic of the connection comprises a thickness of the line; and a first line between a first pair of nodes representing a first pair of documents is thicker than a second line between a second pair of nodes representing a second pair of documents if the first pair of documents are more similar to one another than the second pair of documents are similar to one another.

16. A computer program product comprising:

a computer readable storage medium having computer readable program code embodied therewith, the computer readable program code comprising:

computer readable program code configured to index a plurality of documents into a document library stored in a database;

computer readable program code configured to calculate hash values for each indexed document over each of a plurality of alternative windows;

computer readable program code configured to receive user input selecting a particular one of the plurality of alternative windows;

computer readable program code configured to, in response to receiving the user input selecting the particular one of the plurality of alternative windows, compare each indexed document to each other indexed document using the particular one of the plurality of alternative windows to generate a score for each pair of indexed documents, the score representing a measure of similarity between each pair of indexed documents; and computer readable program code configured to display a visual representation of the similarity of the indexed documents to one another based on the score for each pair of indexed documents.

17. The computer program product of claim 16, wherein computer readable program code configured to display a visual representation comprises:

computer readable program code configured to display a node to represent each indexed document; and computer readable program code configured to display a connection between a least one pair of nodes, wherein a characteristic of the connection represents a measure of similarity between a pair of indexed documents represented by the pair of nodes.

18. The computer program product of claim 17, wherein:

the connection comprises a line; and the characteristic of the connection comprises one of thickness, color, length, or style of the line.

19. The computer program product of claim 17, wherein:

the connection comprises a line;

the characteristic of the connection comprises a length of the line; and a first line between a first pair of nodes representing a first pair of documents is shorter than a second line between a second pair of nodes representing a second pair of documents if the first pair of documents are more similar to one another than the second pair of documents are similar to one another.

20. The computer program product of claim 17, wherein:

the connection comprises a line;

the characteristic of the connection comprises a thickness of the line; and a first line between a first pair of nodes representing a first pair of documents is thicker than a second line between a second pair of nodes representing a second pair of documents if the first pair of documents are more similar to one another than the second pair of documents are similar to one another.

* * * * *